Patented Sept. 5, 1933

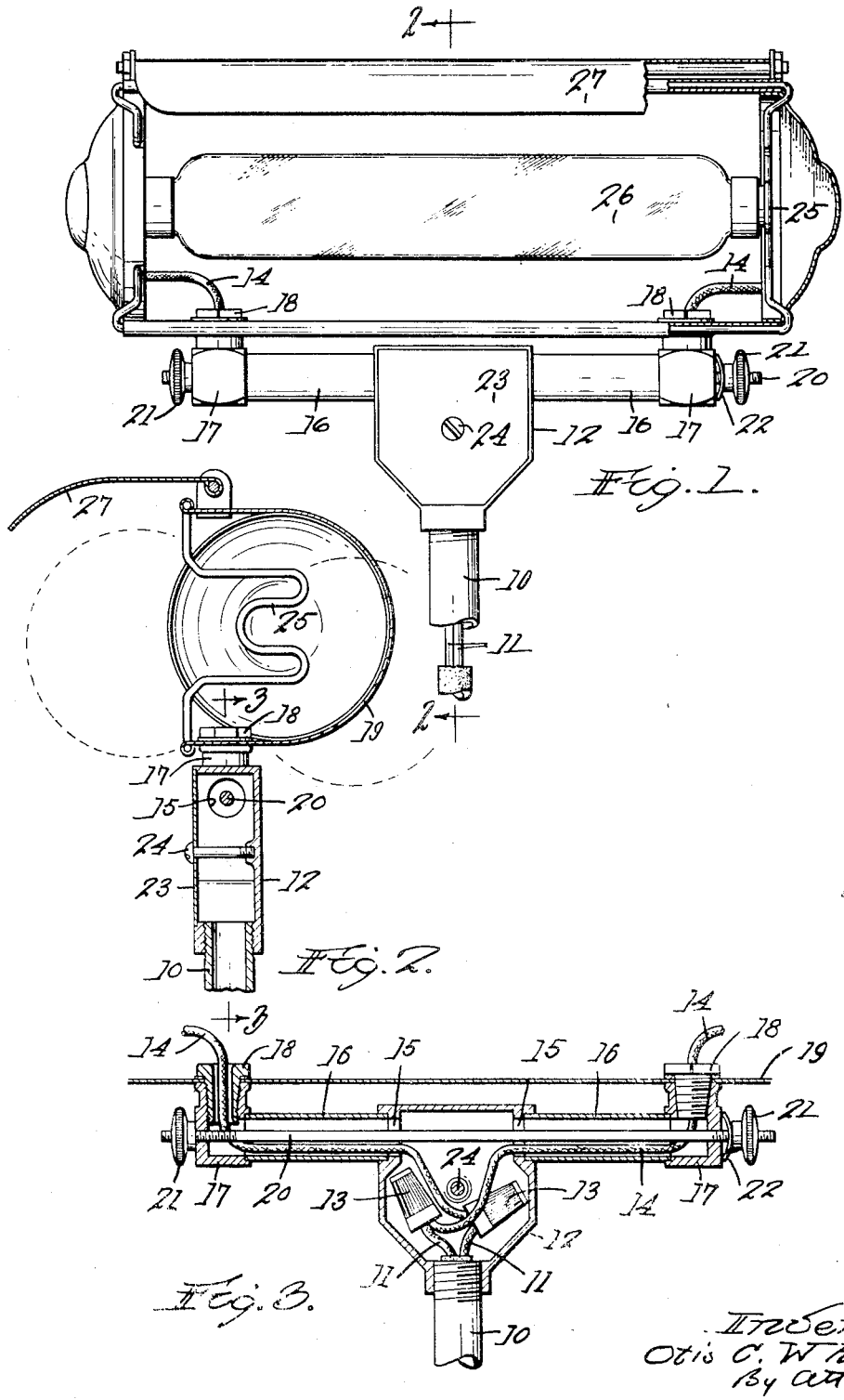

1,925,579

UNITED STATES PATENT OFFICE 1,925,579

TRUNNION FOR ELECTRIC CONNECTIONS

Otis C. White, Worcester, Mass.

Application October 19, 1931. Serial No. 569,824

2 Claims. (Cl. 240—73)

This invention relates to a supporting device for an electrical appliance, having means by which the appliance can be turned on an axis and providing means for concealing the connecting wires.

The principal objects of the invention are to provide this trunnion in such form as to permit the turning of the electrical appliance which it supports without causing a change in the frictional tension controlling such turning and without danger of abraiding the insulation on the connecting wires which it carries; to provide a simple and convenient box for the connections between the inside wires and the more heavily insulated outside wires, and to provide a construction of box and conduit permitting the turning of the supported appliance with a resultant minimum twisting of the inside wires.

Other objects and advantages of the invention will appear hereinafter.

Reference is to be had to the accompanying drawing, in which

Fig. 1 is a front elevation of an electric lamp with a preferred embodiment of this invention shown as supporting it;

Fig. 2 is a sectional view on the line 2—2 of Fig. 1; and

Fig. 3 is a sectional view on the line 3—3 of Fig. 2.

Difficulty has been experienced in the supporting of electric lamps and other electrical devices that have to be turned from one position to another, because the connecting wires get kinked and twisted and also the insulation is apt to become worn and abraided, thus making them unsafe and not infrequently breaking their continuity. With this construction, the lamp or the like can be turned as much as necessary, but the wires cannot become twisted throughout the entire range of revolution so as to result in breakage or abraision of insulation.

The invention is shown as applied to a lighting appliance supported on a pipe 10 in which run the outside or line wires 11, this pipe being shown in this case as vertical. This pipe screws into a junction box 12, which is shown as in the form of a die casting, and supports it. This box has internal space sufficient to receive the connectors 13 (or other method of junction) which may be used to electrically connect the outside wires, which have a comparatively heavy insulation with the inside (or appliance) wires 14. A cover plate 23 is secured over the box 12 by a screw 24. The box 12 also is provided with a pair of opposite axially aligned cylindrical openings 15 which are chamfered at their outside ends to form sockets for receiving a pair of tubes 16 and to provide shoulders for the ends of these tubes. These tubes 16 set into these sockets with frictional engagement thereto and so that they are capable of turning in these sockets.

On the ends of the tubes 16 are elbows 17 also having sockets for the ends of the tubes 16, in which the fit is the same as that described for the fit of these tubes 16 in the box 12. These elbows 17 carry hexagonal-headed bushings 18, which pass through the lamp casing 19 and clamp the same to the elbows 17. One or both of the wires 14 may be passed through either one of the bushings 18 into the lamp casing 19. Each of these bushings 18 has a rounded edge at both ends of the hole passing through it and the threaded shank of each is purposely made slightly longer than the threaded holes in the elbows 17, so that when the bushings 18 are in their intended position their ends will project within the elbows 17 in such a manner as to provide smooth corners around which the wires 14 pass. One hole through the lamp casing 19 is longitudinally oval or slightly larger than the diameter of the threaded shank of the bushing 18, so that the bushing 18 which passes through it may be left free to slide slightly in a direction parallel to the rod 20 and thus prevent resistance to the proper tightening of the nuts 21 which might otherwise occur at this point.

Through the structure passes a rod 20, which is provided with a nut 21 on each end and on one end is a spring washer 22. Obviously, the whole structure can be drawn together by means of these nuts 21 and tightened as much as may be required. The nuts 21 are intended to be tightened to such extent that the parts are held by frictional engagement and yet are free to turn by hand and will remain held in any adjusted position. Both of the wires 14 can be passed through a single one of the tubes 16 if desired; the construction is thus of a flexible nature suiting it to different types of electrical appliances or instruments.

The construction of the assembly above described permits the lamp casing 19 to be turned by hand pressure into angular adjustment relative to the junction box 12 without interference with the frictional tension exerted by the nuts 21 and the spring washer 22, because no turning moment exists between the elbows 17 and the rod 20 when adjustment of the lamp casing 19 is effected. The method of assembly provides for the simultaneous installation of the wires 14 when the parts held together by the rod 20 are assembled, thus greatly facilitating such installation of wires and obviating the procedure of pulling wires into place after the assembly of those parts with consequent strong liability of damage to insulation of those wires.

The lamp casing 19 is provided with springs or brackets 25, in the form shown, for supporting a lamp 26 and a pivoted shade 27 is also shown, but these parts do not constitute features of this invention.

It will be seen that a light and durable construction is provided, by which a lamp or other electrical instrument or appliance can be supported, which will permit the turning of the lamp or the like back and forth about an axis. There is no danger of the insulation of the wires becoming damaged or the wires being twisted in the frequent adjustment of the device, because the lamp cannot be turned continuously in the same direction.

Although I have illustrated and described only one form of the invention, I am aware of the fact that modifications can be made therein by any person skilled in the art without departing from the scope of the invention as expressed in the claims. Therefore I do not wish to be limited to all the details of construction herein shown and described, but what I do claim is:—

1. In a closed support for an electric appliance, the combination of a pipe constituting a conduit for wires connected with a source of power, a junction box having an opening in which said pipe is secured so that the box is supported by the pipe and the wires can be led from the pipe into the box, said box having a pair of opposite cylindrical openings through which the plus and minus instrument wires respectively can be led from the box to a single instrument, tubes having their ends in the last-named openings and extending in opposite directions from the box, through which the instrument wires can be passed, a single rod passing through said tubes and box and adapted to be tightened up to hold the tubes in position and apply frictional resistance to them, whereby the instrument can be turned about a center and held in any position by frictional resistance, a pair of elbows frictionally engaging the outer ends of said tubes through which tubes and elbows the instrument wires are brought into the instrument, and means for supporting the instrument from both elbows.

2. In a trunnion support for an electric appliance, the combination of a box for receiving the wires, a pair of tubes extending from the box, means carried by said tubes for supporting a single electric implement casing and for carrying wires into the casing at opposite ends, said tubes being oscillatable for changing the position of the casing, and means for maintaining at all times the same degree of friction on the surfaces about which the tubes swing.

OTIS C. WHITE.